(12) United States Patent
Watanabe et al.

(10) Patent No.: US 6,226,008 B1
(45) Date of Patent: May 1, 2001

(54) IMAGE PROCESSING DEVICE

(75) Inventors: Yasuhiro Watanabe, Sagamihara; Akio Setsumasa, Tokyo; Takuya Matsumoto, Tokyo; Takao Miyoshi, Tokyo, all of (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/146,936

(22) Filed: Sep. 3, 1998

(30) Foreign Application Priority Data

Sep. 4, 1997 (JP) .................................................. 9-240032

(51) Int. Cl.⁷ .................................................. G06T 15/00
(52) U.S. Cl. .................................................. 345/427
(58) Field of Search .................................. 345/418, 419, 345/427, 428, 424

(56) References Cited

U.S. PATENT DOCUMENTS

| | | | | |
|---|---|---|---|---|
| 5,710,877 | * | 1/1998 | Marimont et al. | 345/427 |
| 5,940,079 | * | 8/1999 | Morino et al. | 345/419 |
| 6,072,497 | * | 6/2000 | Lichtenbelt et al. | 345/424 |

\* cited by examiner

*Primary Examiner*—Cliff N. Vo
(74) *Attorney, Agent, or Firm*—Finnegan, Henderson, Farabow, Garrett & Dunner, L.L.P.

(57) ABSTRACT

A game device enabling adjustment of the virtual viewpoint displaying a game character to be positioned to view the surroundings of the character in a broad range. When the manipulation character C stands still, the viewpoint of the virtual cameral 30 can move along the face of the exterior sphere 40B in accordance with manipulations of the game player. Upon collision with an obstacle, this virtual camera approaches the character in the direction of the face of the interior sphere 40A. However, the virtual camera does not approach the character C beyond the interior sphere.

19 Claims, 10 Drawing Sheets

IMAGE PROCESSING DEVICE

BACKGROUND OF THE INVENTION

The present invention generally relates to image or sound processing devices, and particularly to game devices, specifically to commercial or home TV game machines for such games as action games, shooting games, or role playing games. More specifically, the present invention relates to a game machine for shooting games, or role playing games with fighting scenes in which a player-manipulated character (player character) and an enemy character attack each other.

RELATED ART

Recently, a so-called 3D game has become known which establishes a virtual space by a computer and enables game play within this virtual space. Among the various types of software used with this 3D game machine, there exists a so-called 3D action game in which the player moves a character within a 3D space, and during this movement, combat is realized between the player-manipulated character and an opponent enemy character. One example of this type of game is "Tomb Raiders" (Virgin).

The "Tomb Raiders" game software functions as follows: The player manipulates a control pad of the game device body and moves the player character within a virtual space towards a desired direction. At this time, a virtual camera is placed above or in back of the character, or in any other position, and the game device body displays an image viewed from this camera onto a monitor.

When the player character meets an enemy character or obstacle during his course of movement, an action scene develops into, for example, a shooting scene between the enemy character and the player character. During this action scene, the game machine body conducts processing based on the priority or hitting of the shooting, such as damaging the player character or enemy character, or destroying the obstacle.

The player manipulates the action of the player character by using the control pad. The player character can be manipulated so as to avoid attacks from the enemy character and prevent too much damage from arising to the player character. As result of this processing, a picture reflecting the processing contents is displayed on the monitor.

With the 3D action game described above, the game machine sets the viewpoint mainly on the manipulated character, thereby being unable to show the virtual space to the player broadly as a whole. Therefore, it is difficult for a player with little experience in game manipulation to grasp the situation surrounding the character, thereby making the game somewhat difficult to play.

Therefore, it is an object of the present invention to solve the aims above and provide a 3D game machine with which the player can easily grasp the situation in which the manipulated character is placed within the virtual space, and specifically, to improve the movements of the virtual viewpoint compared to a conventional game machine. In other words, it aims to provide viewpoint movements which can express the surroundings of the character broadly and in an adequate manner, and also to facilitate the manipulation of the viewpoint movements for realizing this aim.

Another object of the present invention is to effectively select and/or reproduce the line more suitable for the situation when the line spoken by the character when it reaches a certain point in a course along which the character moves concurs with the line spoken by the character corresponding to the character status or game situation. The present invention further aims at reflecting the manner of conduct of the character in the line reproduction.

A further object of the present invention is to provide a game machine enabling a player with little experience in the manipulation of the game machine to enjoy the game longer. It also aims at providing movement repetitions of the game character's movements for recovery.

SUMMARY OF THE INVENTION

In order to achieve the objects above, one aspect of the present invention is an image processing device which displays on display means the image of a character moving within a virtual space projected from a virtual viewpoint at a predetermined position, characterized in that said image processing device comprises viewpoint position setting means for setting the area within which said virtual viewpoint can move along the face of a three-dimensional shape at a predetermined distance from said virtual object, wherein said viewpoint position setting means receives a manipulation signal corresponding to the amount of movement of said virtual viewpoint from input means, and thereby allows said virtual viewpoint to move continuously inside said area.

The three-dimensional shape above may be, for example, a sphere. It may also be any other polygonal shape. Furthermore, when the virtual object changes from a moving state to a standstill state, the viewpoint position setting means may perform movement of the virtual viewpoint. Also, the input means may comprise a crosskey for controlling the movement direction of the virtual object, and the virtual viewpoint may be structured so as to be able to move around the virtual object by the crosskey. Moreover, the crosskey may be provided with switching means for switching between the direction control of the virtual object and movement control of the virtual viewpoint. Also, the device may further comprise judging means for Judging the overlapping of the virtual viewpoint with an obstacle within the virtual space. wherein, when overlapping occurs, the viewpoint position setting means moves the viewpoint so as to avoid the vicinity of the obstacle near the virtual object.

Another aspect of the present invention is a sound processing device for game use wherein a predetermined line of speech is generated from sound replay means during the movement of a character within a virtual space, characterized in comprising first line generation controlling means for generating a first line of speech when the virtual object reaches a predetermined point within the virtual space: second line generation controlling means for generating a second line of speech regardless of the first line of speech when the game situation becomes a predetermined situation; line priority judging means for judging the priority between the first line and the second line; and line replay means for replaying a line of speech corresponding to the priority.

A further aspect of the present invention is a game machine wherein a predetermined line of speech is generated from sound replay means during the movement of a character within a virtual space, the game machine comprising line generation controlling means for generating a predetermined line of speech when the character reaches a predetermined point within the virtual space, wherein the line generation controlling means judges the conduct mode of the character at the point, selects a line suiting each of the conduct modes of the character, and causing the selected line to be replayed from the sound replay means.

In one embodiment of the preceding aspect of the present invention, the conduct mode of the character is at least one of the direction, passage frequency and passage time of the character at the point.

A still further aspect of the present invention is a game device for performing predetermined obstructive processing for a character while moving the character within a virtual space, and when this image processing is performed for the character more than as predetermined, the end of the game is directed, the game device comprising image processing means for providing a predetermined extension even when the image processing is performed for the character, and, unless the image processing is performed for the character during the extension, the obstructive processing is prevented from affecting the character.

In one embodiment of the preceding aspect of the present invention, the obstructive processing is a virtual attack processing for a player character, and wherein the image processing means comprises attack judging means for judging that the virtual attack processing has been performed for the player character reattack judging means for judging that the virtual attack processing has been performed again to the player character during the extension period; and life diminishing means for diminishing the remaining durability of the player character when the attack judgment and reattack judgment is positive.

Another aspect of the present invention is a game machine for moving a virtual object within a virtual space in a predetermined direction, wherein the moving state of the virtual object is displayed on display means as an image from a virtual viewpoint, the game machine comprising manipulation means for giving reactivation orders to the virtual object for supplementing the activation during a predetermined activation of the virtual object. According to one embodiment of the present invention, the manipulation means is means for changing the vector of reactivation.

Still another aspect of the present invention is a game device for displaying an image of a virtual object arranged within a virtual space seen from a predetermined viewpoint, comprising judging means for judging whether the virtual object is positioned on a line of view connecting the viewpoint with a target point targeted by the viewpoint; and distance adjusting means for increasing or reducing the distance between the viewpoint and the target point based on the judgment results of the judging means. The distance adjusting means may cause the viewpoint to advance along the line of view when the judgment means judges that the virtual. object is positioned along the line of view.

A further aspect of the present invention is a game device for displaying an image of a game character moving within a virtual space seen from a predetermined viewpoint in correspondence with the manipulations of the game player, comprising judgment means for judging whether a virtual object arranged within said virtual space is positioned between the viewpoint and the game character; and viewpoint controlling means for controlling the viewpoint so that the viewpoint approaches the game character when the judging means makes a positive judgment.

A still further aspect of the present invention is a game device for displaying a virtual game space as seen from a predetermined viewpoint, comprising virtual point setting means for setting a virtual point moving within the game space in correspondence with the manipulations of the game player; and viewpoint controlling means for moving the viewpoint so as to follow the virtual point, wherein the viewpoint controlling means sets a target point targeted by the viewpoint at a position at a predetermined distance from the viewpoint.

Another aspect of the present invention is a game device for manipulating a game character having a predetermined durability, comprising condition judging means for judging whether a condition for diminishing said durability has been fulfilled; timing means for timing a predetermined period of time when the condition has been fulfilled and diminishing means for diminishing the durability when the condition is fulfilled again during the period of time measured by the timing means.

DESCRIPTION OF THE PREFERRED EMBODIMENT

Now, embodiments of the present invention will be described with reference to the drawings. The image processing implemented by this embodiment is outlined as follows. During the game processing, the character manipulated by the player (player character) moves along a predetermined movement map (course), and a screen scrolled (the screen proceeds in a certain direction or the background moves within the screen) in the direction of movement is displayed on the monitor.

Within the virtual space, the player character, enemy character or any other main virtual objects are structured from polygons, and the background is structured from a scroll screen. Within the three-dimensional space (3-D space) which is the virtual space, a virtual camera is set to a predetermined location, and an image seen from the virtual camera is displayed on the monitor.

Figure 1:
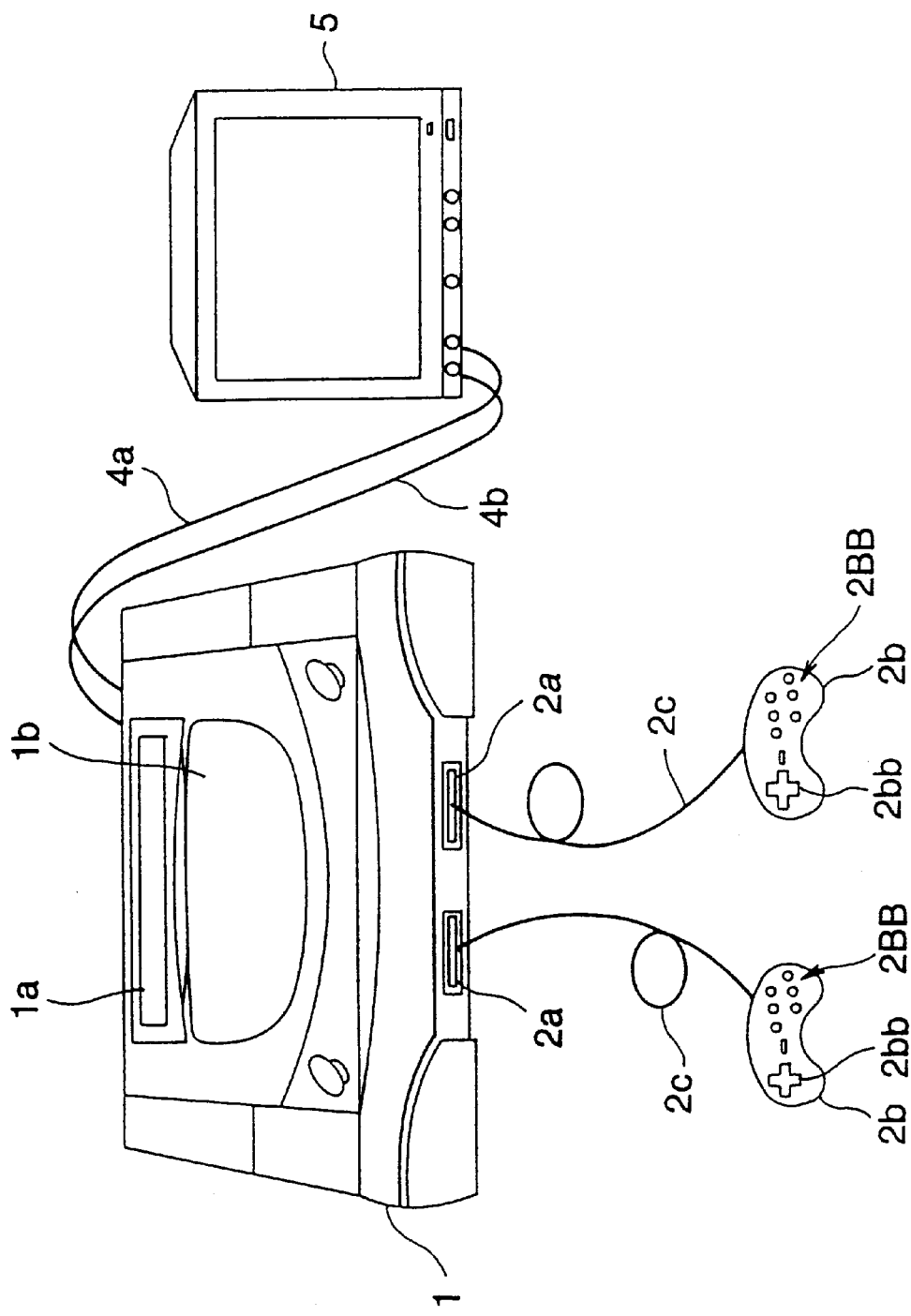
FIG. 1 is an exterior view of the TV game device.

Next, the hardware of the game device will be explained. FIG. 1 shows the basic structure thereof, and corresponds to the perspective view showing the exterior view of the game machine. In this drawing, reference numeral 1 denotes the body of a TV game machine for home use. In front of this TV game machine body 1. two connectors 2a, 2a have been provided, and peripherals 2b, 2b such as pads for game machine manipulation are connected to these connectors 2a, 2a via cables 2c, 2c.

These peripherals comprise a crosskey 2bb for controlling the movement direction of the characters, etc., and a plurality of manipulation button keys 2BB. When the player pushes these keys. the manipulation signals are sent to the game machine body, and the g am e machine body realizes predetermined image processing such as determination of the movement direction of a predetermined character in correspondence with the manipulation signal.

Furthermore, on top of the TV game machine body 1, a cartridge interface (cartridge I/F) 1a is provided for connection with the ROM cartridge. Similarly, on top of the TV game machine body 1, a CD-ROM drive 1b for reading CD-ROMs is provided. On the back of the TV game machine body 1, a video output terminal and audio output terminal have been provided, although not illustrated. This video output terminal is connected to the video input terminal of the TV receiver 5 via the cable 4a.

This audio output terminal is connected to the audio input terminal of the TV receiver 5 via cable 4b. With this game machine, the user can manipulate the peripherals 2b, 2b to play the game by manipulating the player character while looking at the screen projected on the TV receiver 5.

Figure 2:
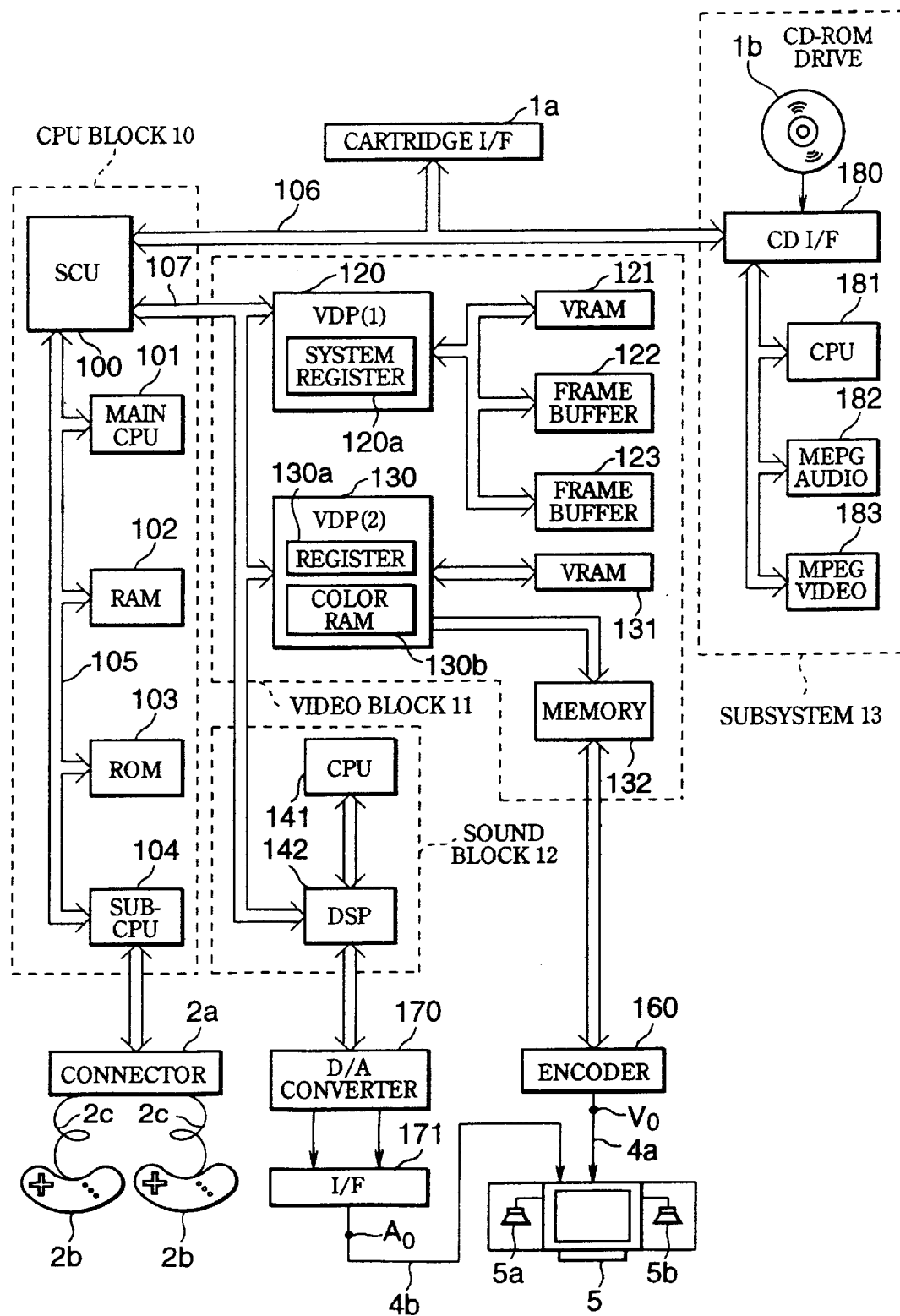
FIG. 2 is a detailed block view of the TV game device.

FIG. 2 is a functional block view of the hardware of this game machine. The game device body is, among others, structured of a CPU block 10 for controlling the device as a whole, a video block 11 for conducting display control of the game screen, a sound block 12 for generating sound effects, etc., and a subsystem 13 for reading CD-ROMs.

The CPU block 10 is structured of an SCU (System Control Unit) 100, main CPU 101, RAM 102, ROM 103. cartridge I/F 1a, subCPU 104, CPU bus 105, etc.

The main CPU 101 conducts control of the device as a whole. This main CPU 101 comprises computing functions similar to the DSP (Digital Signal Processor) in its interior and can implement application software at a high speed.

RAM 102 is used as a work area for the main CPU 101. ROM 103 has been written with initial programs, etc., for initial processing. SCU 100 can control the buses 105, 106, 107, and can thereby perform data input and output mutually between the main CPU 101, VDPs 120, 130 and the DSP 140 in a smooth manner.

Furthermore, SCU 100 comprises a DMA controller in its interior and can retransmit the character data (polygon data) in the game to the VRAM 121 within video block 11.

The cartridge I/F 1a is for inputting the application software supplied in ROM cartridge form into a predetermined block inside the TV game machine body.

The sub-CPU 104 is called an SMPC (System Manager & Peripheral Control), and comprises functions such as collecting peripheral data via connectors 2a, 2a from peripherals (control pad) 2b, 2b, corresponding to demands from the main CPU 101.

The main CPU 101 performs image control such as rotational conversion or perspective conversion (of the coordinates. etc.) of characters in a virtual space (three-dimensional space) based on peripheral data received from the sub-CPU 104, and performs processing for displaying these on the screen.

The connectors 2a, 2a can be connected to an arbitrary peripheral such as a pad, a joystick. and a keyboard, etc. The sub-CPU 104 comprises the functions of automatically recognizing the peripheral type connected to the connectors 2a, 2a, and to collect the peripheral data, etc., pursuant to the communication rules corresponding to the profile type.

The video block 11 comprises a first VDP (Video Display Processor) 120 performing drawing of the polygon screen to be overwritten onto the character made of polygon data and the background image of the TV game, and a second VDP 130 for performing drawing of the scroll background screen, screen synthesis between the polygon image data and the scroll image data based on priority (display priority), and clipping, etc.

The first VDP 120 has an integrated system register 120a, and is connected with a VRAM (DRAM) 121 and frame buffers 122, 123. The drawing data of the polygons representing the TV game character is transmitted to the first VDP 120 via the main CPU 101, and the drawing data written into the VRAM 121 is written into the drawing frame buffer 122 (or 123) in, for example, 16-bit or 8-bit/pixel form. The data in the written frame buffer 122 (or 123) is transmitted to the second VDP 130 during the display mode.

In this way, buffers 122, 123 are used as the frame buffer, thereby taking a double-buffer structure which switches for each frame between the drawing and the display. Furthermore, regarding the information controlling the drawing, the first VDP 120 controls the drawing and the displaying in accordance with instructions set in the system register 120a of the first VDP 120 via the SCU from the main CPU 101.

In contrast, the second VDP 130 has an integrated register 130a and an integrated color RAM 130b, and is connected to a VRAM 131. Furthermore, the second VDP 130 is connected to the first VDP 120 and SCU 100 via a bus 107, and is connected to the video output terminal $V_0$ via the memory 132 and the encoder 160. The video output terminal $V_0$ is connected via a cable 4a to the video input terminal of the TV receiver 5.

In this second VDP 130, the scroll screen data is defined within the VRAM 131 and the color RAM 130 from the main CPU 101 via the SCU 100. Similarly, the information for controlling the image display is defined within the second VDP 130. The data defined within the VRAM 131 is read by the second VDP 130 in accordance with the contents set in the register 130a and become the image data of each scroll screen representing the character background. The image data of each scroll screen and the image data of the polygon data with texture mapping thereon as transmitted from the first VDP 120 have their display priority determined in accordance with the setting of the register 130a, and are synthesized to the final display screen data.

When this display image data is in palette form, the color data defined within the color RAM 130b is read out by the second VDP 130 in accordance with its values, and the display color data is generated. Furthermore, when the display image data is in RGB form, the display image data becomes the display color data as is. This display color data is output to the encoder 160 after being stored in the memory 132. The encoder 160 generates the image signals by adding synchronized signals, etc., to this image data, and supplies them to the video input terminal of the TV receiver 5 via the video output terminal $V_0$. Thereby, the game screen is displayed on the screen of the TV receiver 5.

The sound block 12 comprises a DSP 140 for performing sound synthesis according to the PCM or FM system, and a CPU 141 for controlling, etc., this DSP 140. The sound data generated by this DSP 140 is converted into two-channel sound signals via a D/A converter 170, and thereafter is supplied to the audio output terminal $A_0$ via an interface 171.

This audio output terminal $A_0$ is connected to the audio input terminal of the TV receiver 5 via a cable 4b. Therefore, the acoustic signal is input via the audio output terminal $A_0$ and the cable 4b from the audio input terminal of the TV receiver 5 to the audio amplifying circuit (not illustrated).

The sound signal amplified by this audio amplifying circuit drives the speakers 5a, 5b integrated in this TV receiver 5.

The subsystem 13 is structured of a CD-ROM drive 1b, a CD-I/F 180, a CPU 181, an MPEG-AUDIO unit 182, and an MPEG-VIDEO unit 183, etc. This subsystem 13 functions to read the application software supplied in CD-ROM form and to perform replay of the animation, etc.

The CD-ROM drive 1b is for reading data from the CD-ROM. The CPU 181 is for performing processing such as control of the CD-ROM drive 1b and correction of mistakes in the read data. The data read from the CD-ROM are supplied via the CD-I/F 180, a bus 106 and a SCU 100 to the main CPU 101, and are used as application software.

Furthermore, the MPEG-AUDIO unit 182 and the MPEG-VIDEO unit 183 are units for restoring data compressed according to the MPEG (Motion Picture Expert Group) standards. By using this MPEG-AUDIO unit 182 and this MPEG-VIDEO unit 183 to restore MPEG compressed data written in the CD-ROM, replay of the animation becomes possible.

The CD-ROM described above corresponds to the storage medium storing the program causing the game machine body to execute the various image/sound processing to be described below. This storage medium additionally includes a RAM, a cartridge ROM, an HDD, an FD, a communication medium and a server.

(Control of Movement of Virtual Viewpoint)

Figure 3:
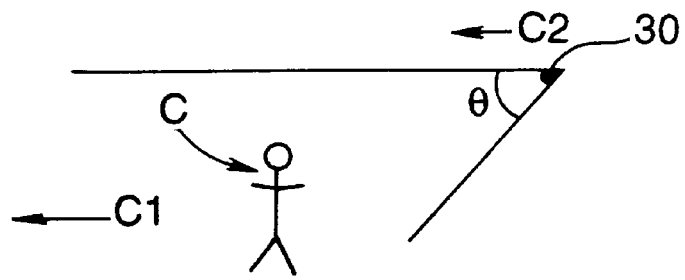
FIG. 3 is a model view indicating the relation between the character and the virtual viewpoint.

FIG. 3 is an abstract view of the movement form of the virtual viewpoint when the character C is in a moving state. When the player character is moving in the direction of arrow C1, the virtual camera viewpoint 30, approximately above and in back of this character, moves to pursue the character in the direction of arrow C2. This camera viewpoint comprises a visual angle θ directing the target point (direction of view) to the character C so as to look down on character C.

Figure 4:
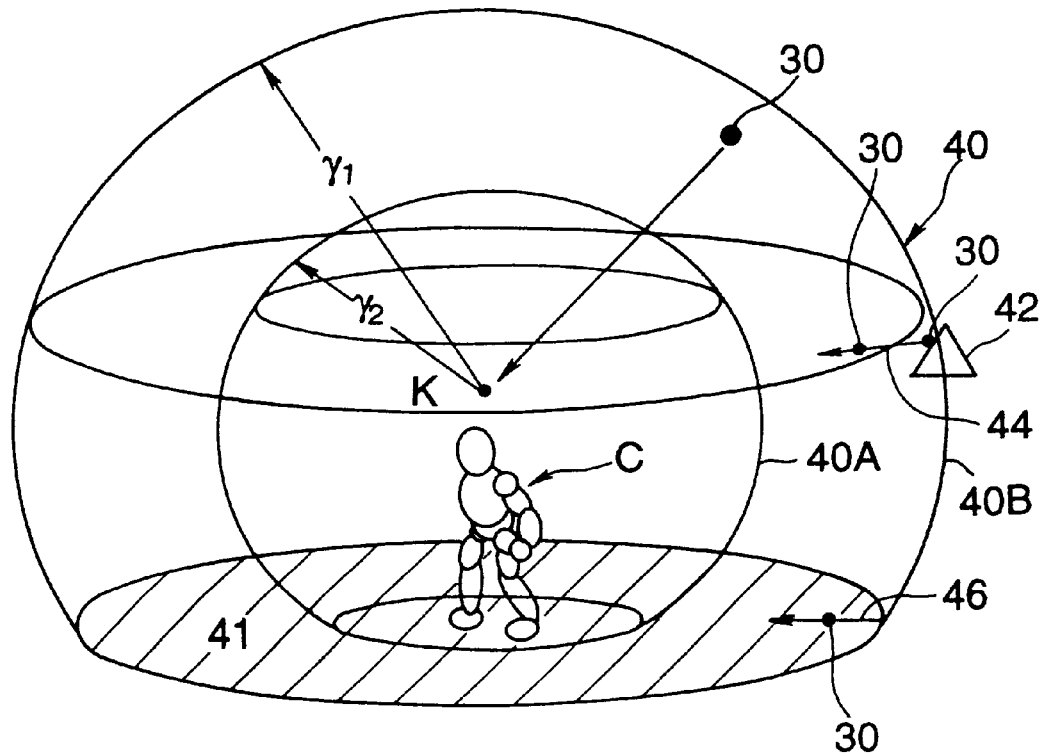
FIG. 4 is a model view indicating the movement control operation of the viewpoint.

FIG. 4 is a model view for describing the movement control of the virtual viewpoint. When changes in the character activation occur such as when the character C becomes substantially a standstill state after a running or moving state, or a state occurs where the movement control of the virtual viewpoint becomes necessary or where this movement control may be effective, the viewpoint 30 of the virtual camera sets its target point to the standard point of the character, namely a position approximately 90 cm above the center of gravity of the character (around the waist of the body) in a substantially standstill state, and is made to be three-dimensionally movable at a constant speed and at approximately the same distance in the area around the target point. The viewpoint 30 moves along a spherical face 40. Accordingly, when the character is running or moving, the viewpoint control is restricted in the movement of direction of the character, and when the character stands still, or the like, the range in which the viewpoint can move is set wide, enabling the player to grasp the surrounding of the character broadly. When a demand for movement control of the viewpoint arises as described above, the character movement may be changed, for example, making the character stand still.

The normal position of the viewpoint 30 of the virtual camera in FIG. 4 is controlled to be placed so as to look down upon the character corresponding to the direction in which the character is facing, from the back at a predetermined position distanced from said target point (e.g., 160 cm) and at a predetermined angle (e.g., 30°).

The character may be for example approximately 160 cm high, and the target point K is set at a position approximately 10 cm above the head. Thereby, it is possible for the virtual camera 30 to provide an image wherein the character is visible down to its foot from the viewpoint, namely the game player can easily understand the depth of the space.

The spherical face 40 is comprised of the face of the inner sphere 40A near the character C and the face of the outer sphere 40B distant from the character C. The virtual viewpoint can be controlled to near or go away from the character within the area between these spherical faces, an area with some width, namely between the faces of the inner and outer spheres. In other words, the distance between the character and the virtual viewpoint is controlled to be between radius r1 and r2.

The radius r1 of the outer sphere 40B is structured for example to be 160 cm. A virtual tension to working outwards is set for the camera, namely the game machine has applied virtual centrifugal and centripetal forces to the camera. Therefore, the camera moves substantially along this face of the outer sphere because an outward tension is applied to the camera. According to the embodiment described here, the game player cannot adjust the distance between the camera and the character.

The radius r2 of the inner sphere 40A is for example 48 cm. This value can be set to approximately the limit to which the character can near the camera. If the virtual camera 30 nears the character more, it is likely that the polygon forming the display object such as a character may not be expressed correctly. Therefore, the game machine prevents the camera from nearing the character beyond this inner sphere.

Furthermore, the image processing means of the game device body (main CPU) judges the overlapping (collision) of the spatial coordinates of the virtual camera 30 and another object (obstacle 42 or ground 41, etc.), and the judgment is positive. This overlapping is called a collision, and when collision is judged to have occurred, the game machine moves the virtual viewpoint in the directions of arrows 44 or 46 to cause the other object to avoid the character C. The arrow 44 denotes a form of proceeding of the virtual camera after it has reached an obstacle 42, namely moving toward the target point along a line connecting the camera with the target point. Arrow 46 denotes a movement course of the camera after its collision with the ground to near the character along the ground.

In this way, when the game machine judges that the obstacle has collided or come into contact with the camera, control is adapted to near the camera to the character, it is possible to display an impressive screen broadly displaying the main display target, which is the character.

Even when the camera moves in this way, the camera does not intrude further into the inner sphere 40A towards the character, as stated above. Assuming the other object came into contact with the face of the inner sphere, the camera would collide with or reach the other object and thereafter be unable to move further, or be buried in and move together with the other object, whichever control has priority. However, it is naturally not impossible to advance the camera from the inner sphere towards the character.

Figure 5:
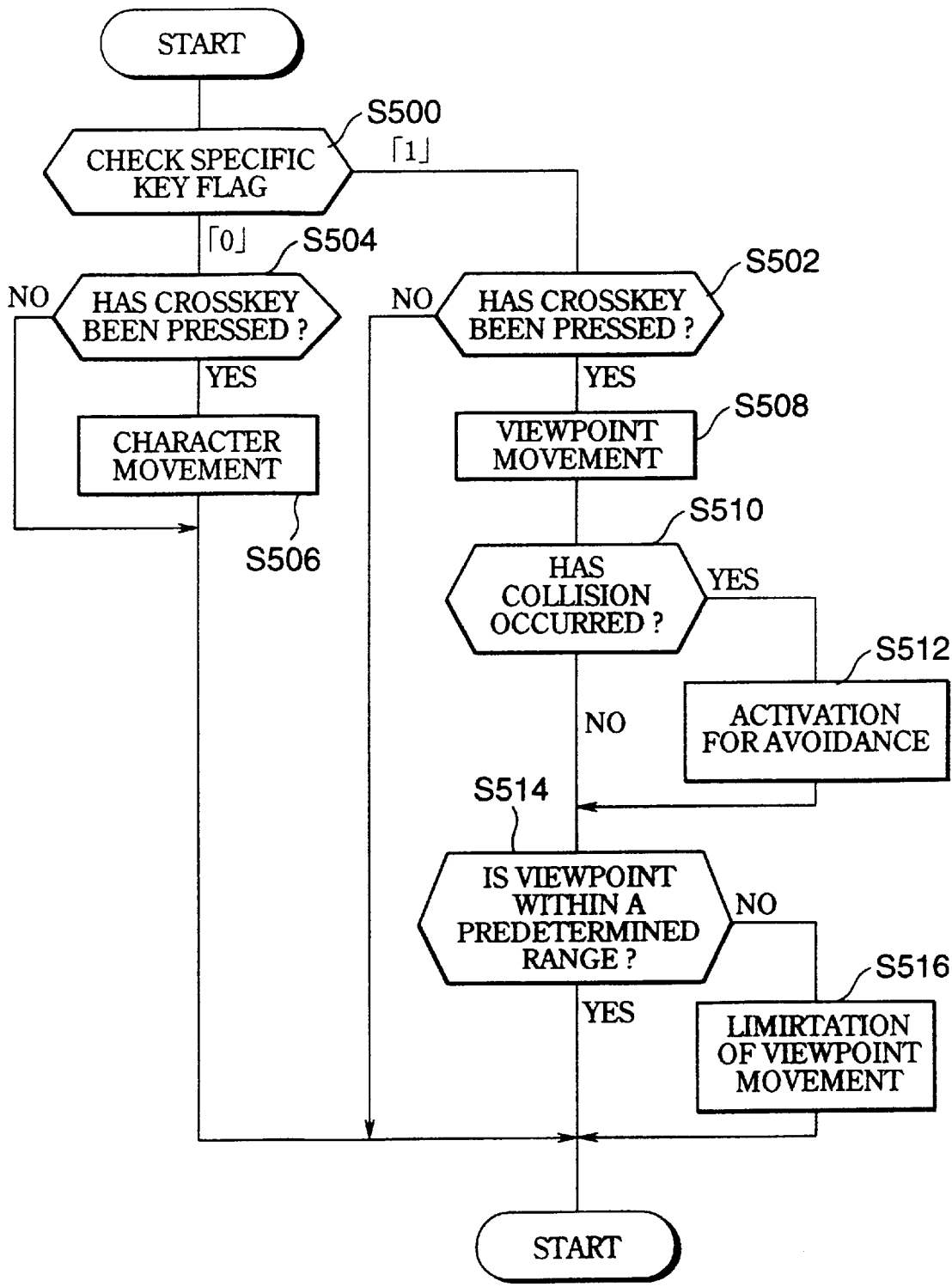
FIG. 5 is a flowchart for movement control of the viewpoint.

FIG. 5 is a flow chart for realizing the viewpoint movement control of FIG. 4. In S500, the pushing flag of a specific manipulation button key of the control pad is checked. As described above, the specific manipulation in the foregoing sentence means cases where the player makes manipulations for stopping the character or where the player desires to confirm the virtual space surrounding the character.

When a specific button key is pressed and the flag corresponding to the pressing of this manipulation key is set to "1," the player manipulates a key so the target which can be manipulated changes from the character C (state of FIG. 3) to the virtual camera 30 (state of FIG. 4). In the mode of FIG. 4, the player may manipulate the camera position by manipulating the control pad by hand. In the mode of FIG. 3 preceding this state, the virtual camera automatically follows a moving manipulated character C.

When in S500 the flag is set to "1," it is judged in S502 whether the crosskey has been pressed. When the crosskey has not been pressed the viewpoint is not moved and returns. On the other hand, if the specific manipulation button key has not been pressed, or the pressing of the specific manipulation button key has been released, it is assumed that the flag is equal to "0" and proceeds to S504.

In S504, it is also judged whether the crosskey has been pressed, and if not, the character position remains the same and returns. If in S504 the pressing of the crosskey is judged positive, the player character is moved in the direction the crosskey was pressed.

If in S502 the pressing of the crosskey is judged positive, one proceeds to S508, and the virtual viewpoint 30 is moved as shown in FIG. 4 along the direction of the pressing. Next, in S510, the collision judgment of the virtual viewpoint 30 and the other object is conducted, and when the judgment is positive, the virtual viewpoint is moved to avoid the other object or along the other object as shown by arrows 44 and 46 in FIG. 4 (S512).

When the collision judgment is negative in S510. and after the processing in S512, it is judged in S514 whether the viewpoint is between 40A and 40B in FIG. 4. When the viewpoint tries to cross this range, the viewpoint is prevented from moving beyond 40A and 40B (S516).

On the other hand, when it is judged in S514 that the viewpoint is within this range, the process of S516 is not performed and the processing returns. Furthermore, during the avoiding movement in S512, the image processing means of the game machine body, the viewpoint may also be moved beyond the range between 40A and 40B. Normally, the viewpoint avoiding the other object is structured not to be included between 40A and 40B. Of course, when the viewpoint avoids the obstacle, the processing of S514 and S516 may be omitted.

S500 described above corresponds to the commencement means of the viewpoint movement form of FIG. 4, S502 corresponds to the means for judging the existence of a viewpoint movement requirement, S508 corresponds to viewpoint movement means, S510 corresponds to the means for judging the collision between the viewpoint and another object, S512 corresponds to the avoiding means for the viewpoint to avoid collision with another object, and for no obstacle to come between the viewpoint and the character C, S514 corresponds to the judging means for preventing the viewpoint from nearing or going away from the character C any more than necessary, and S516 corresponds to the viewpoint position controlling means.

In this way, as the viewpoint can move along the spherical face, the game machine can show to the game player a broad image of the surroundings of the character. It is also possible to move the viewpoint by using the crosskey for controlling the character movement direction as is.

As a variation of the flowchart in FIG. 5, when the character is substantially in a standstill state, the viewpoint control may be performed as in FIG. 4. A substantially standstill state of the character means that the character completely stands still, or that the movement speed of the character has reached a predetermined value or less, etc. When the manipulation signal for moving the character is not input to the game device body from the control pad for a predetermined period of time, the character is judged to be substantially in a standstill state.

Regarding the collision judgment between the virtual camera and the other object it is also possible to perform collision judgment between the straight line (line of view) as a whole connecting the camera viewpoint 30 with the target point K, and the other object. In this case, when the collision judgment is positive, the camera is advanced until the obstacle comes forward. Thereby, even where there is an obstacle between the camera and the target point (at this time, there is no collision between the camera and the obstacle itself), it is possible to prevent the camera from moving behind the obstacle.

Otherwise, instead of bringing the camera nearer to the character, it is possible to move the camera away from the character. Regarding the target point, it is not specifically limited so long as it is at a position which does not go into the character body and at the same time follows a base point.

(Line of Speech Replay Control)

Figure 6:
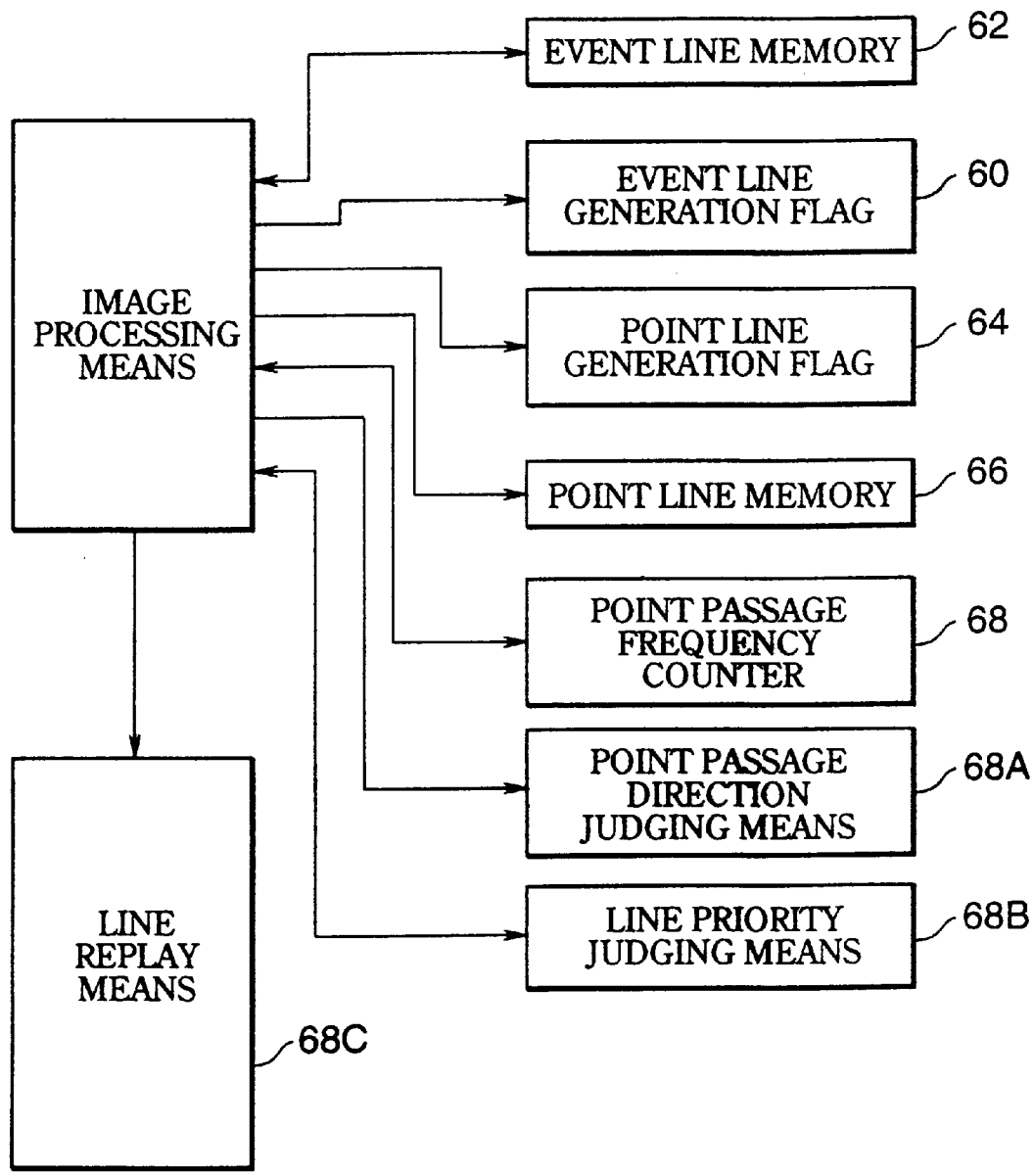
FIG. 6 is a functional block view for line generation control.

FIG. 6 is a block view showing the line of speech replay control flowchart. The game device body described above comprises an event line generating flag 60 of a predetermined bit, an event line memory 62, a point line generating flag 64, a point passage frequency counter 68, a point passage direction judging means 68A, a point line memory 66, a line priority judging means 68B, and a line replay means 68C. Each of these means and the means for image processing of the game device body above are connected with each other.

Among these means, the event line generating flag is a flag for detecting the occurrence of a predetermined event. For example, after a set time has passed from the game start, or the remaining durability of the character has become a set value or less, a flag "1" is set apart from the character reaching a point as will be described below to indicate that the game situation has become a predetermined situation. After the event or the event line has ended, resetting is performed.

An event line is a line corresponding to an event, and a specific line is allocated inside the ROM for each predetermined event in table form.

Figure 7:
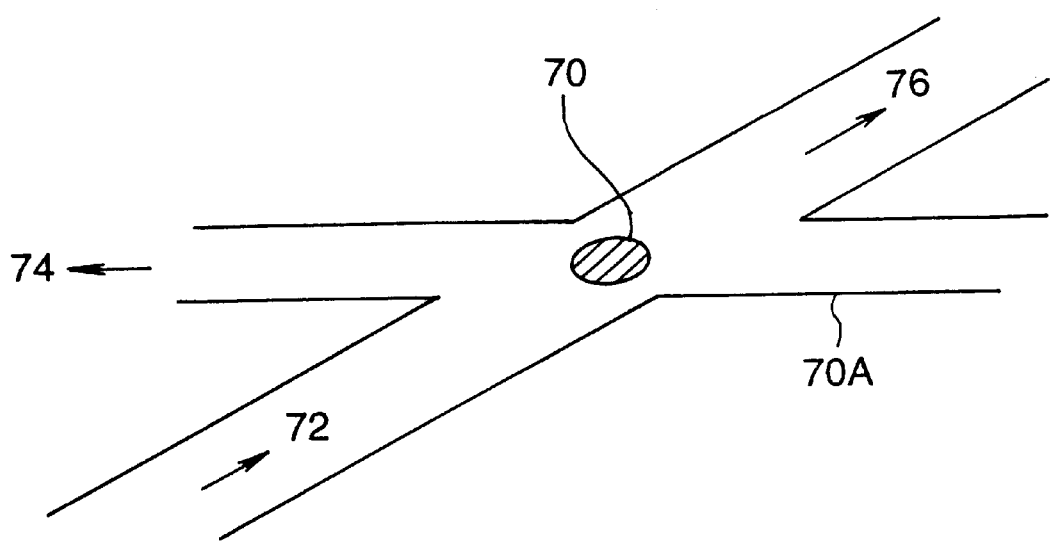
FIG. 7 is a model view indicating a point on a course along which the character moves.

A point means is, as shown in FIG. 7, a point or circular area, etc., set virtually during the course 70A, along which the character can move. When the character reaches this point, the point flag becomes "1." After passing the point or after replay of the point line, resetting is performed.

A point passage frequency counter is a counter for counting the number of times the character passes a specific point. A point passage direction judging means is means for judging in which direction the character was facing when it reached such point. The cardinal points are set for the character within the virtual space.

A point line memory is a memory which stores a group of lines to be replayed when the character reaches or passes a specific point and the flag is set. This is structured within the ROM. The memory has stored therein a plurality of lines in table form. Lines are selected and replayed as necessary from this table corresponding to the number of counts of the point passage frequency counter and the judgment results of the passage direction judging means.

A line priority judging means is means for judging the priority among a plurality of lines. Priority is set respectively for an event line and a point line. Upon receiving the judgment results, the image processing means replays only the lines with high priority or lines in accordance with their priority from among the selected event lines or point lines to the line replay means. If the priority is the same, such lines shall be replayed with equal priority.

Figure 8:
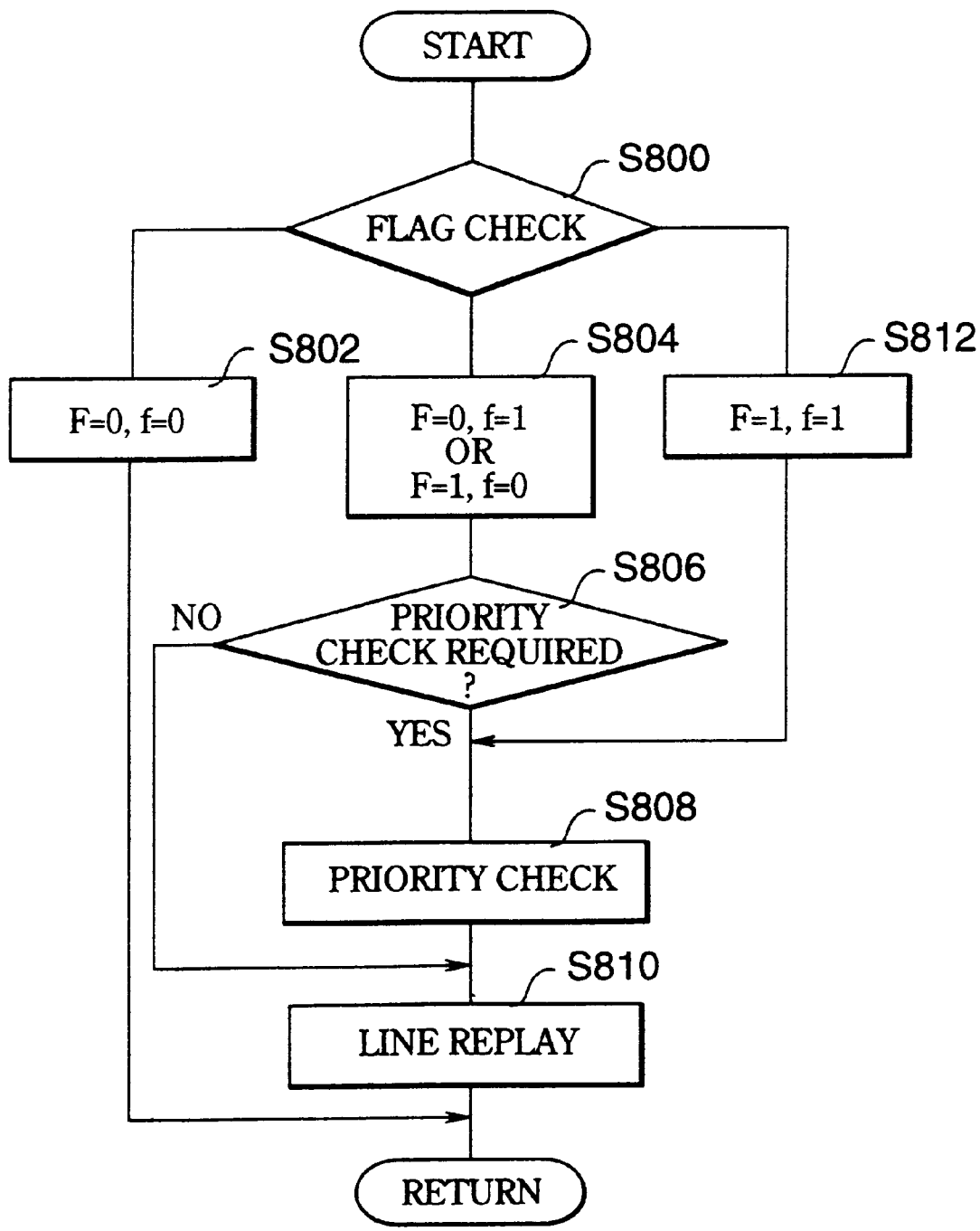
FIG. 8 is a flowchart for line generation control.

FIG. 8 shows a movement flowchart for this functional block view. First, in step 800, the event line flag (F) and the point line flag (f) are checked. If both flags F and f are "0," it is judged in step 802 that there is no situation for generating a line and return is performed.

In S804, when flag F is "1" and flag f is "0," only the event line is replayed. In this case, when there is only one event line to be selected, no priority check is performed and this line is replayed. This is equal to negating the judgment in S806. On the other hand, where a plurality of possible event lines exist (when a plurality of flags are "1" from among the event line flag group F1, F2, . . . ), priority check is performed and the line with high priority is replayed. This is equal to performing the processing in S808 and S810 after the judgement in S806 is judged positive. This is the same as with the case where in S804 F=0, f=1, namely when only the point line is to be replayed.

When flag F=1 and f=1, the priority of the lines is checked and the line with high priority is replayed. This is equal to performing S812 and reaching S808.

Assuming that the player character is attempting to pass point P in FIG. 7 coming from the direction of arrow 72 and advancing in the direction of arrow 74. As shown in FIG. 7, point P is set at a location where the course from the arrow 72 branches off in three directions.

If the character does not reach the point and no event has occurred, no line will be replayed after S802. Next, when the character reaches point P from the direction of arrow 72, the passage frequency is set at "1" at the point passage counter. Furthermore, the direction in which the character is facing when passing a point is judged to be either North, South, East or West by the point passage direction judging means. According to the results thereof, the pertinent line such as "Caution. Enemy nearby," is generated. This corresponds to performing the processing in S804, S806 and S810 in order.

At this time, when for example an event occurs where the remaining durability falls lower than the set value during the game progress with a character, only the event line with high priority, namely the line "Urgently need energy supply" is replayed with priority over the prior lines. This corresponds to performing the processing in S812, S808 and S810 in order.

On the other hand, if a character does not reach a point and an event occurs, specific lines allocated to the events are replayed in the order of S804, S806 and S510.

Next, if the game player recognizes that he has moved the character to face the direction of arrow 76 instead of arrow 74 by mistake, he may turn back. When he reaches point P again, the point passage frequency of the character is set to two in the point passage counter. It is then judged that the character faces point P from the front with the target direction arrow 74 to the character's right.

Then, only the line "Move to the rights" (i.e. the line urging movement in the direction of arrow 74) having higher priority than the line "Urgently need energy supply" pertinent to these results is replayed, or such line is replayed first, and thereafter the line "Urgently need energy supply" is replayed. This corresponds to replaying the processing in S812, S808 and S810 in order.

Factors for switching between these lines are, as described above, the number of times the character has passed the point, the direction in which the character was facing when it passed the point (North, South, East or West), and if a certain range was set for the point, the time required for passing such range, the time required up to passage of the point from a predetermined location in the game, the parameter values, etc., of the character when passing the point, the conduct situation of the character, the conduct form, and character status, etc.

Furthermore, judgment is made regarding the line to be replayed successively based on the priority judgment after the line replayed first has ended, whether such line is still maintained in a replayable status, for example, whether the character has already left the point during the replay of the event line, the replay of such line may be cut away. Furthermore, even if the character is not so far away from the point and the line to be replayed successively is in a replayable status, it is also possible to omit the generation of the line when the character moves in the correct direction during the replay of the event line (situation where the character is moving in the direction of arrow 74 in FIG. 7).

According to the processing described above, it is possible to replay with priority the line suiting the situation of the character. Therefore, the line corresponding to the game situation is replayed promptly and adequately, thereby enabling the game player to continue the game for a longer period of time. By setting the navigation point, it is possible to convey the course along which the player character will pass to the game player, so it is possible to easily search the movement course of the player character.

(Control for Extension of Time During Obstructive Processing)

Figure 9:
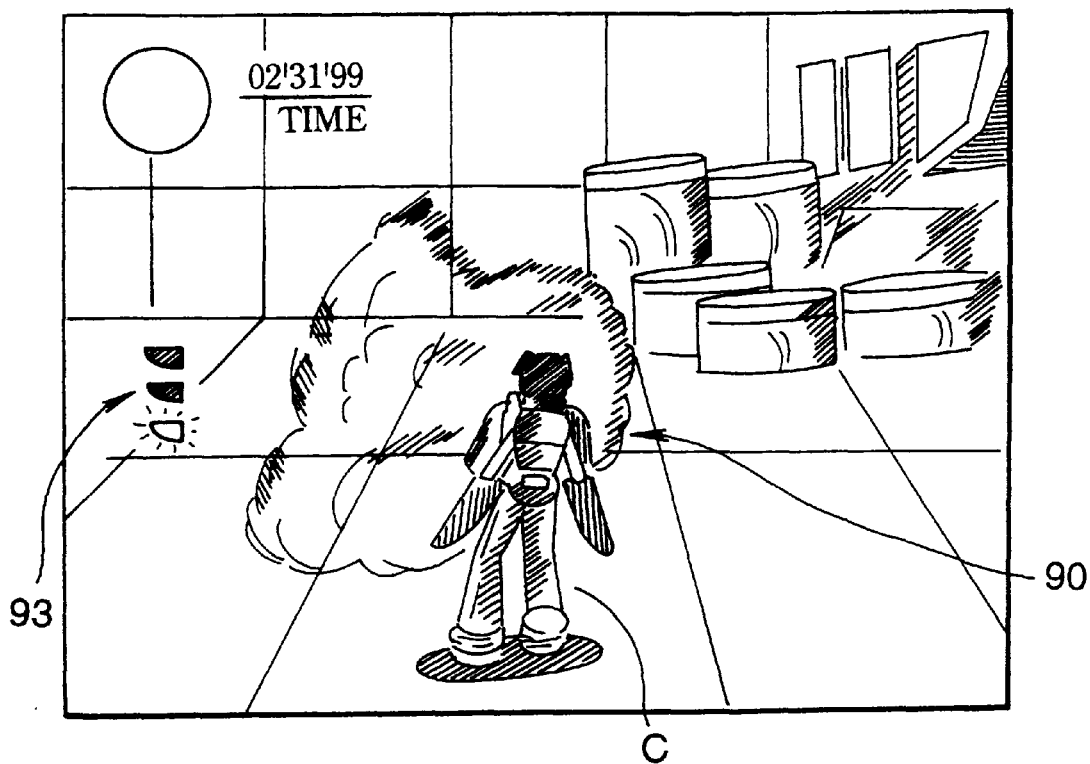
FIG. 9 is a game screen for describing obstructive image processing of the character.

Obstructive processing shall hereinafter mean a processing which obstructs the continuation of the game by reducing for example the remaining durability of the character. A first embodiment of this processing is an image processing. FIG. 9 shows a game screen, indicating a character C with a predetermined durability, and a fire 90. The reference 93 is a life counter indicating the durability life of the character. This counter is made of three gauges (93*a–c*), as shown in FIG. 10, and the larger the number of gauges lightened, the greater the remaining durability.

When a collision occurs between the character C and the fire 90, the remaining durability of the character diminishes. When the remaining durability of the player character is a predetermined value or less, for example "0," the game ends, or the game is discontinued and must be restarted from a predetermined game time. When the lightened scales of the gauge representing the life counter are successively put out, the remaining durability diminishes by such scales.

Figure 11:
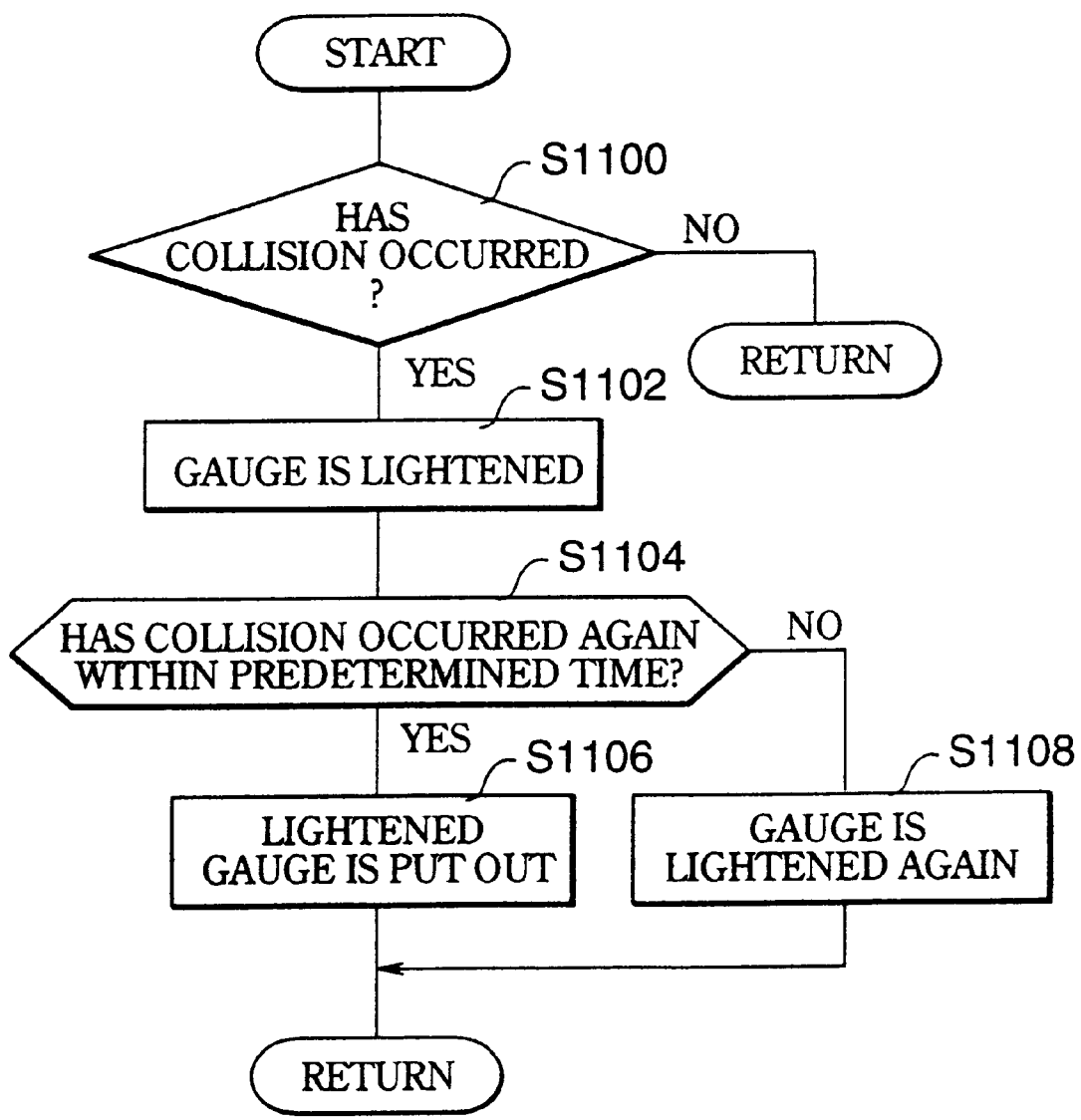
FIG. 11 is a flowchart for obstructive screen processing prevention control.

FIG. 11 indicates a flow chart for this control, and it is judged first at S1100 whether a collision has occurred between the character and an obstacle such as a fire or enemy bomb. When this judgment is negative, the game returns without proceeding to the subsequent processing.

Figure 10:
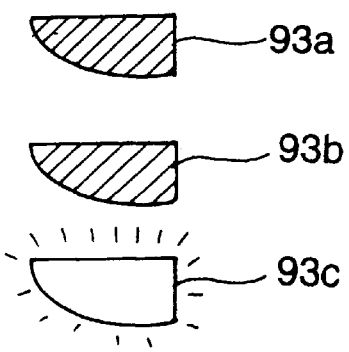
FIG. 10 is a model view of a gauge indicating the remaining durability of the character.

On the other hand, when this judgment is positive, one of the gauges in FIG. 10 (93*c*) is changed from the on state to the off state at S1102. The game player can recognize by this off state whether a collision for obstructive processing has occurred with the player character.

Thereafter, proceeding to S1104, it is judged whether another collision has occurred within a predetermined time (e.g., within 10 seconds). If no collision has reoccurred, one proceeds to S1108, and the gauge which was in an off state is restored to the on state. Thereby, the remaining durability of the character will not diminish but the life of the character is restored to the state before the occurrence of the collision in S1100.

In contrast, assuming a collision has occurred again within the predetermined time period in S1104, the gauge is actually put off for one scale which was in an off state, and processing is performed for actually diminishing the remaining durability of the character (S1106).

According to this image processing flow chart, even if the game player has mistaken his manipulation of the player character and the character has been damaged, the game player can prevent damages from actually occurring to the character by skillfully manipulating the character. As a result, the game player is granted an extension with regard to obstructive image processing, and by obtaining an opportunity to compensate for mistakes in manipulating the game device or for his own inexperience, the game can be continued for a longer period of time.

Furthermore, instead of providing for an extension time, it is possible to provide for other types of allowances. Taking an allowance in distance as an example, until the character proceeds past a predetermined distance, or until the character reaches a predetermined location.

(Control for Readjustment of Movement)

Figure 12:
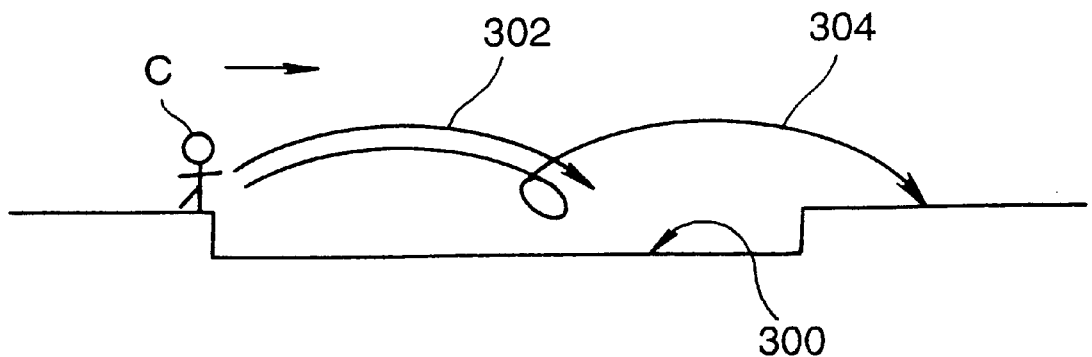
FIG. 12 is a model view of the control for reactivation of the character.

As shown in FIG. 12, it is assumed that there exists a bank 300 in the map in which the character moves. As long as the game player is pushing the crosskey of the control pad, when the character reaches the beginning of the bank, the character C will automatically attempt a jump as denoted by arrow 302 and clear the bank 300 without requiring the game player to push any other button instructing a jump.

However, if the bank is long, the jump according to arrow 302 will not reach the other end of the bank. When a predetermined manipulation button is pushed during the course of the jump, the jump is continued further as shown by arrow 304, enabling the character to clear the bank.

The image processing means of the image processing device body judges whether a specific manipulation button of the control pad has been pressed, and when this manipulation button has been pressed, reads in the motion data according to arrow 304 from the ROM and successively replays this motion for one frame each.

Figure 13:
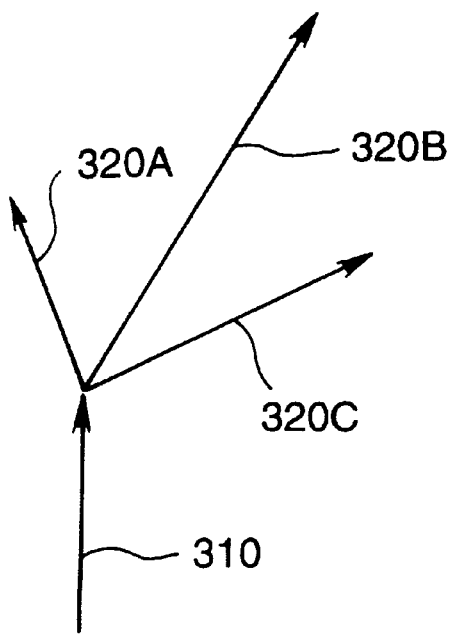
FIG. 13 is a model view for changing the movement vector of the reactivation.

The image processing means detects the pushed time of the specific manipulation button and pushed direction of the crosskey during the second half of the jump instruction, and thereby enables the control of the vector of the second half of the movement of the character (jump) as shown in FIG. 13.

During this control, as shown in FIG. 13, even when the character is in the course of a movement (such as the jumping movement corresponding to the vector of arrow 310), it is possible to add a supplementary movement (arrow 320), and adjust the vector of the added movement as appropriate, as shown by 320A–320C. Therefore, for example if the shape of the bank becomes unexpectedly complicated, the game player will be able to cope therewith.

As explained above, the game device relating to the resent invention can provide an effective processing for playing a game within a three-dimensional virtual space. In other words, the movements of the virtual viewpoint are improved in comparison with conventional game machines. It furthermore provides movements of the viewpoint which enable broad and precise visualization of the surroundings of the virtual object (game character, etc.). It also facilitates the manipulation of the viewpoint movements therefor.

The present invention can also effectively replay the line of speech which suits the situation more in the event a line to be generated when a virtual object reaches a point along a course of movement of the virtual object and a line corresponding to the status of the virtual object or game situation concur. It is also possible to reflect the line replay into the conduct manner of the virtual object.

Still further, the present invention provides a TV game machine enabling even a player inexperienced in the manipulation of the TV game to enjoy the game for a longer time. It is also possible to add additional movements for recovery to the movements of the virtual object.

We claim:

1. An image processing device which displays on display means the image of a virtual object moving within a virtual space projected from a virtual viewpoint at a predetermined position, said image processing device comprising viewpoint position setting means for setting the area within which said virtual viewpoint moves along the face of a three-dimensional shape at a predetermined distance from said virtual object, wherein said viewpoint position setting means receives a manipulation signal corresponding to the amount of movement of said virtual viewpoint from input means, and thereby allows said virtual viewpoint to move continuously inside said area.

2. An image processing device according to claim 1, wherein said three-dimensional shape is a sphere.

3. An image processing device according to claim 1 or 2, wherein when said virtual object changes from a moving state to a standstill state, said viewpoint position setting means performs movement of said virtual viewpoint.

4. An image processing device according to claim 1 or 2, wherein said input means comprises a crosskey for controlling the movement direction of said virtual object, and wherein said virtual viewpoint is structured so as to be able to move around said virtual object by said crosskey.

5. An image processing device according to claim 4, wherein said crosskey is provided with a switching means for switching between the direction control of said virtual object and movement control of said virtual viewpoint.

6. An image processing device according to claim 1 or 2, further comprising judging means for judging the overlapping of said virtual viewpoint with an obstacle within said virtual space, wherein, when overlapping occurs, said viewpoint position setting means moves said viewpoint to avoid the vicinity of said obstacle near said virtual object.

7. A processing device wherein a predetermined line of speech is generated from sound replay means during the movement of a virtual object within a virtual space, comprising:

first line generation controlling means for generating a first line of speech when said virtual object reaches a predetermined point within said virtual space;

second line generation controlling means for generating a second line of speech regardless of the first line of speech when the game situation becomes a predetermined situation;

line priority judging means for judging the priority between said first line and said second line; and line replay means for replaying a line of speech corresponding to said priority.

8. A processing device wherein a predetermined line of speech is generated from sound replay means during the movement of a virtual object within a virtual space, said processing device comprising line generation controlling means for generating a predetermined line of speech when said virtual object reaches a predetermined point within said virtual space, wherein said line generation controlling means judges the conduct mode of said virtual object at said point, selects a line suiting each of the conduct modes of the virtual object, and causing the selected line to be replayed from said sound replay means.

9. A device according to claim 8, wherein the conduct mode of said virtual object is at least oneof the direction, passage frequency, and passage time of said virtual object at said point.

10. A game processing device for performing predetermined obstructive processing for a virtual object while moving said object within a virtual space, and when this image processing is performed for said virtual object more than as predetermined, the end of the game is directed, said game processing device comprising image processing means for providing a predetermined extension even when said image processing is performed for said virtual object, and, unless the image processing is performed for said virtual object during said extension, the obstructive processing is prevented from affecting said virtual object.

11. A device according to claim 10, wherein said obstructive processing is a virtual attack processing for said virtual object, and wherein said image processing means comprises:

attack judging means for judging that said virtual attack processing has been performed for said virtual object;

reattack judging means for judging that said virtual attack processing has been performed again to said virtual object during said extension period; and life diminishing means for diminishing the remaining durability of said virtual object when said attack judgment and reattack judgment is positive.

12. An image processing device for moving a virtual object within a virtual space in a predetermined direction, wherein the moving state of said virtual object is displayed on display means as an image from a virtual viewpoint, said image processing device comprising manipulation means for giving reactivation orders to said virtual object for supplementing the activation during a predetermined activation of said virtual object.

13. A device according to claim 12, wherein said manipulation means conveys an order to said virtual object for changing the vector of reactivation compared to that of the activation before the reactivation.

14. An image processing device for displaying an image of a virtual object arranged within a virtual space seen from a predetermined viewpoint, comprising:

judging means for judging whether said virtual object is positioned on a line of view connecting said viewpoint with a target point targeted by said viewpoint; and distance adjusting means for increasing or reducing the distance between said viewpoint and said target point based on the judgment results of said judging means.

15. A device according to claim 14, wherein said distance adjusting means causes said viewpoint to advance along said line of view when said judgment means judges that said virtual object is positioned along said line of view.

16. An image processing device for displaying an image of a game character moving within a virtual space seen from a predetermined viewpoint in correspondence with the manipulations of the game player, comprising:

judgment means for judging whether a virtual object arranged within said virtual space is positioned between said viewpoint and said game character; and viewpoint controlling means for performing control so said viewpoint approaches said game character when said judging means makes a positive judgment.

17. An image processing device for displaying a virtual space as seen from a predetermined viewpoint, comprising:

virtual point setting means for setting a virtual point moving within said space in correspondence with the manipulations of the game player; and viewpoint controlling means for moving said viewpoint so as to follow said virtual point, wherein said viewpoint controlling means sets a target point targeted by said viewpoint at a position at a predetermined distance from said viewpoint.

18. A game processing device for manipulating a game character having a predetermined durability, comprising:

condition judging means for judging whether a condition for diminishing said durability has been fulfilled;

timing means for timing a predetermined period of time when said condition has been fulfilled; and diminishing means for diminishing said durability when said condition is fulfilled again during the period of time measured by said timing means.

19. A storage medium for storing the processing program of the device according to any one of claims 1 through 18.

* * * * *